Nov. 5, 1929.   C. PEARSON   1,734,396
MOWING MACHINE
Filed April 9, 1927   7 Sheets-Sheet 1
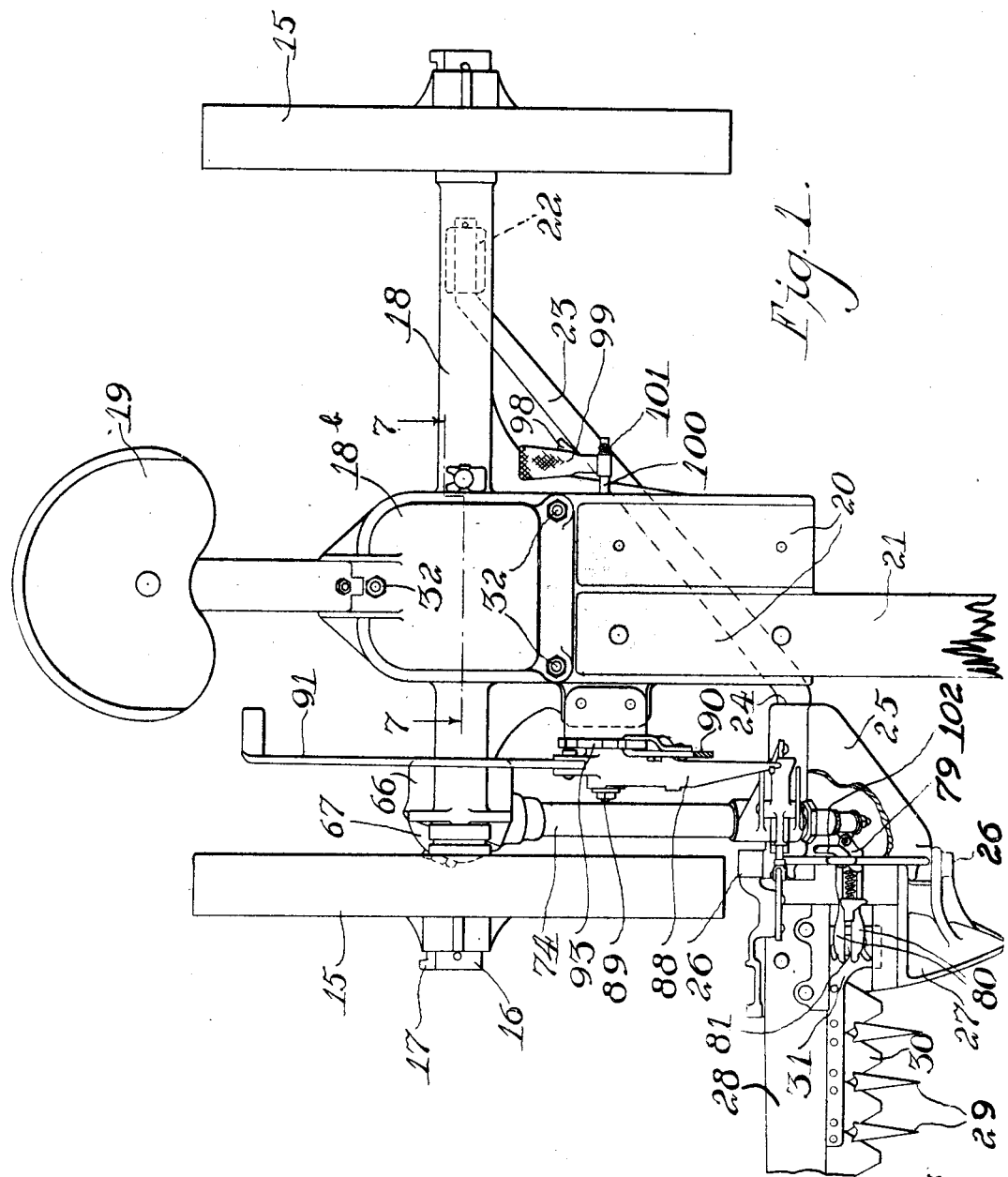

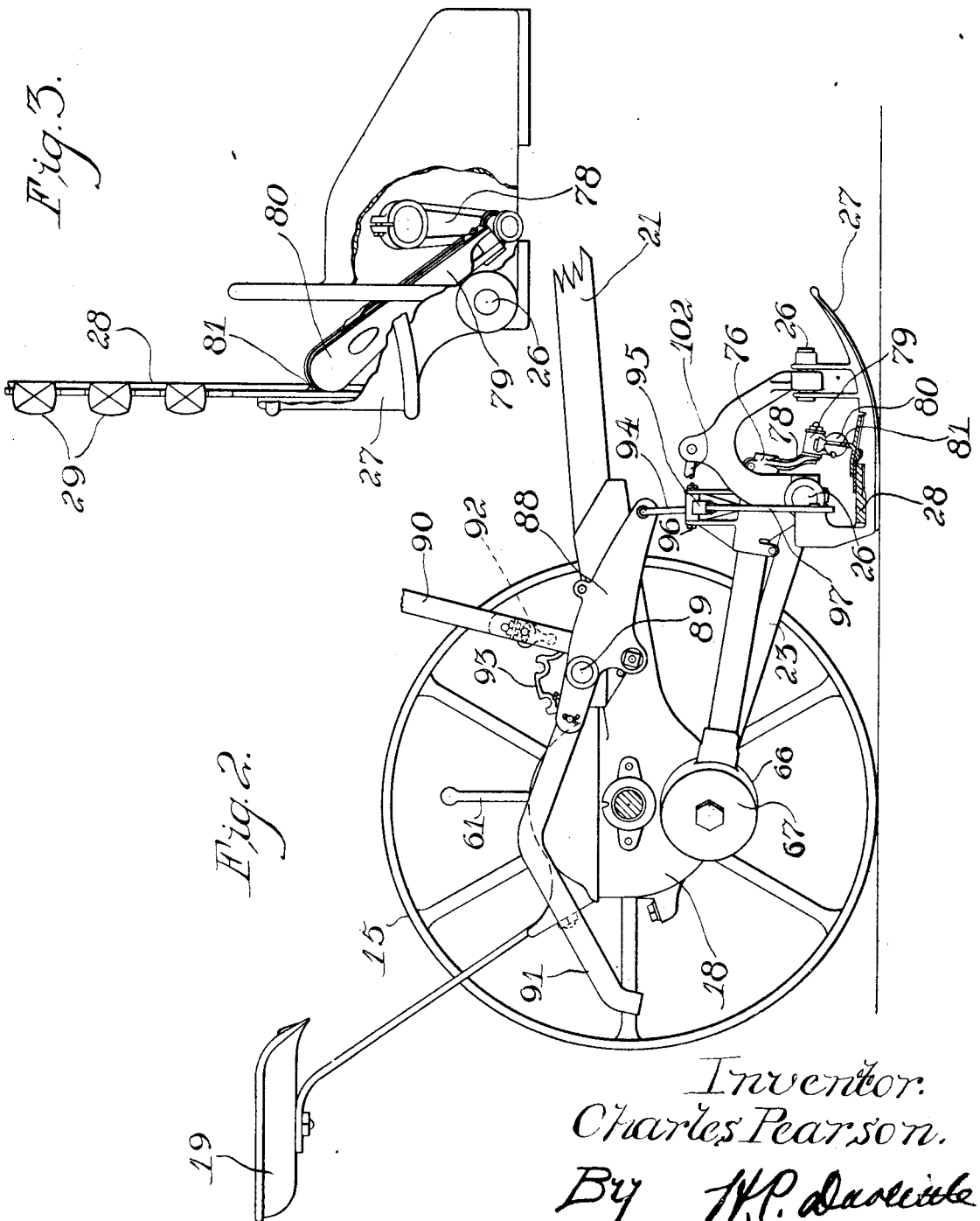

Nov. 5, 1929.  C. PEARSON  1,734,396
MOWING MACHINE
Filed April 9, 1927   7 Sheets-Sheet 3
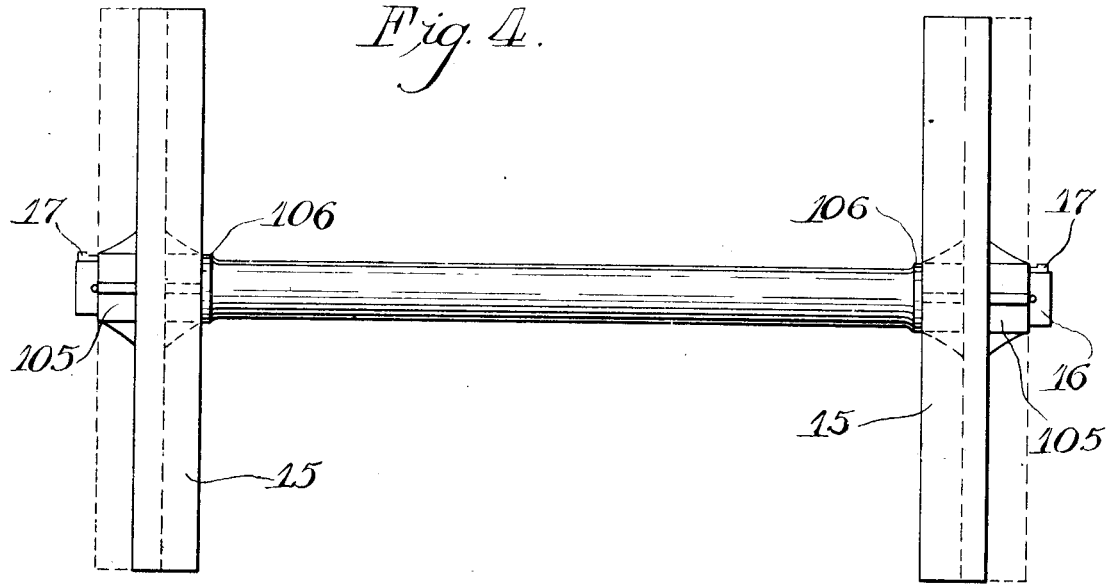
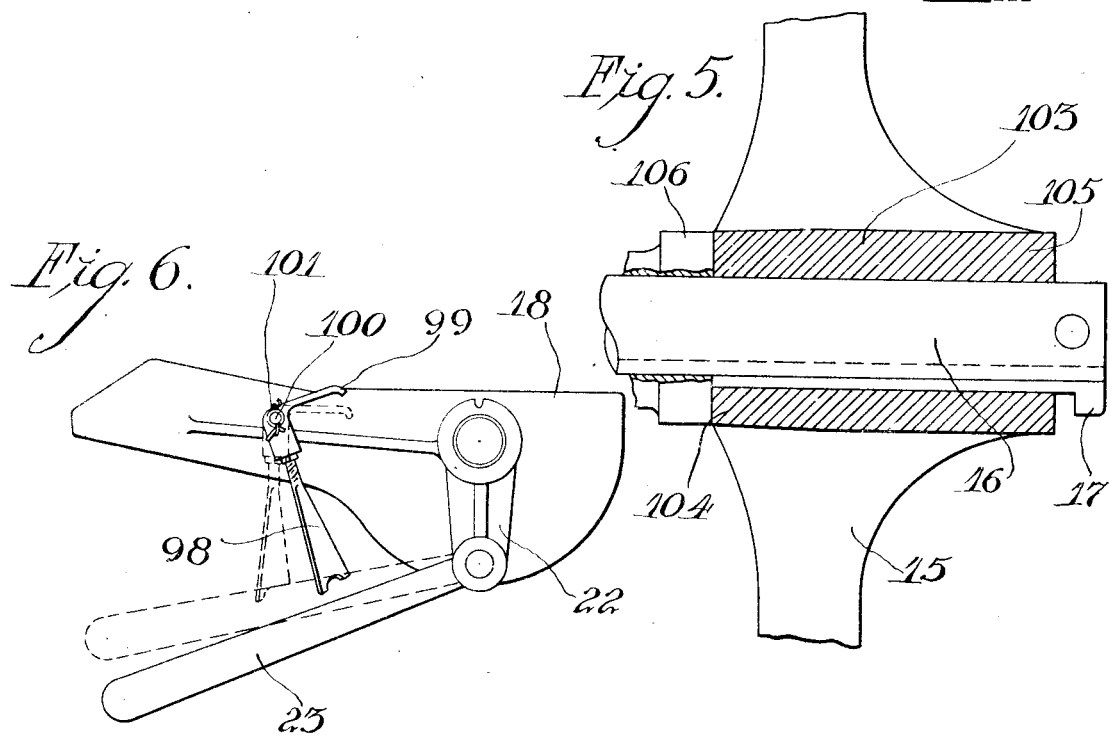
Inventor.
Charles Pearson.
By H.P. Doolittle
Atty.

Nov. 5, 1929.                C. PEARSON                  1,734,396
                            MOWING MACHINE
                         Filed April 9, 1927           7 Sheets-Sheet 4
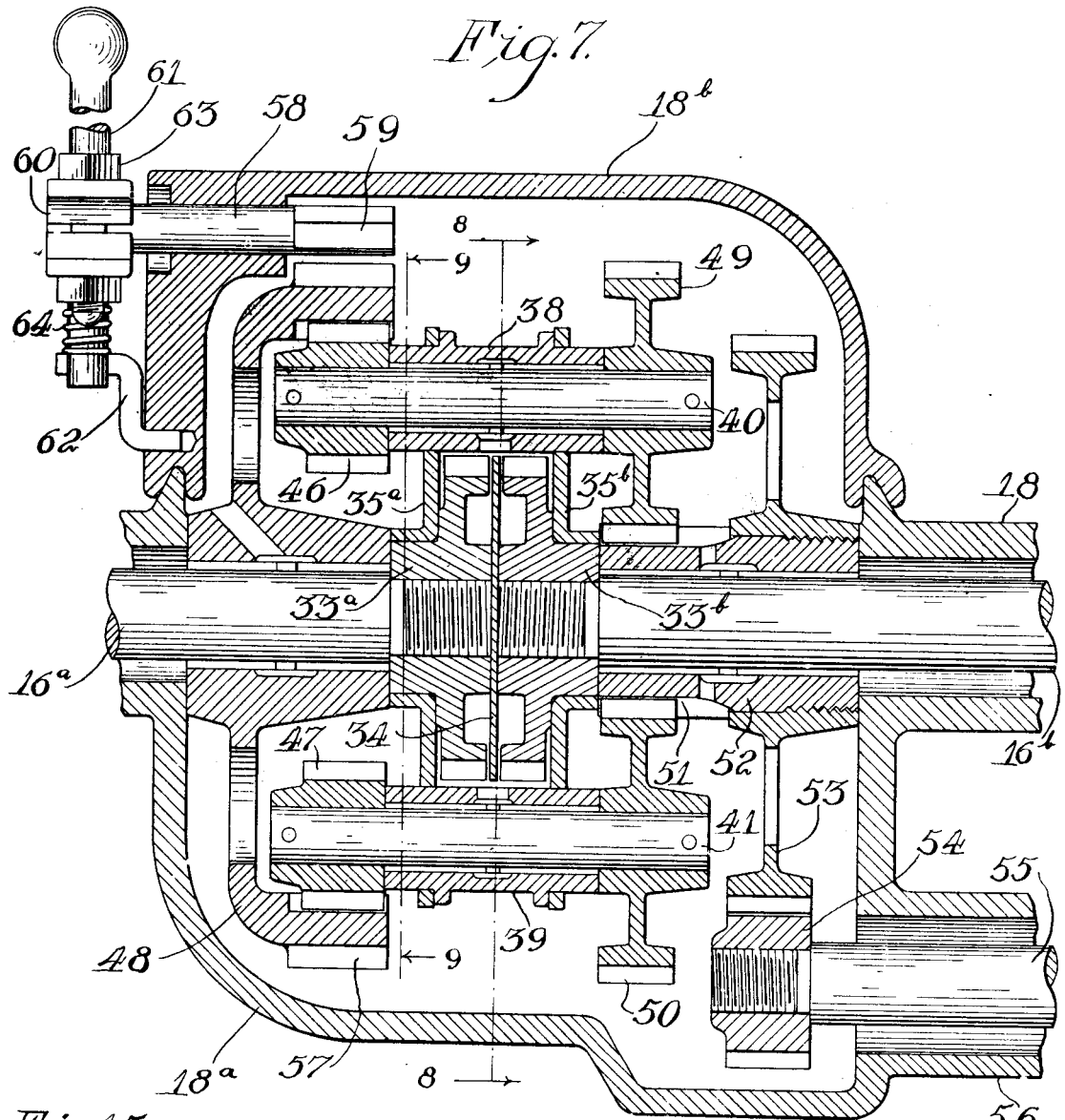
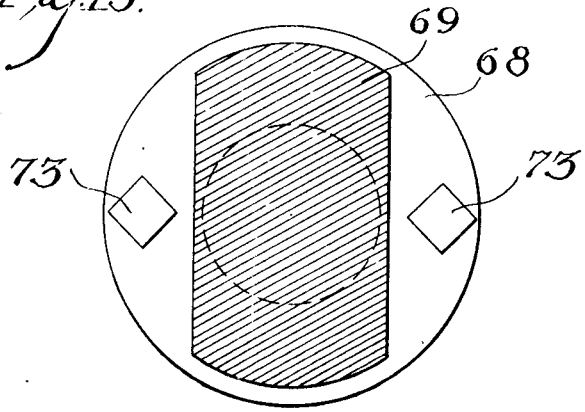
Inventor.
Charles Pearson
By H. P. Dalicate
Atty.

Nov. 5, 1929.  C. PEARSON  1,734,396
MOWING MACHINE
Filed April 9, 1927  7 Sheets-Sheet 5

Inventor.
Charles Pearson.
By H.P. Doolittle
Att'y.

Nov. 5, 1929.  C. PEARSON  1,734,396
MOWING MACHINE
Filed April 9, 1927  7 Sheets-Sheet 6
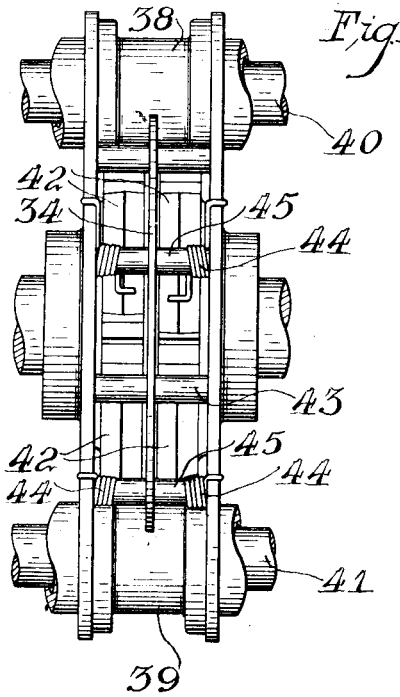
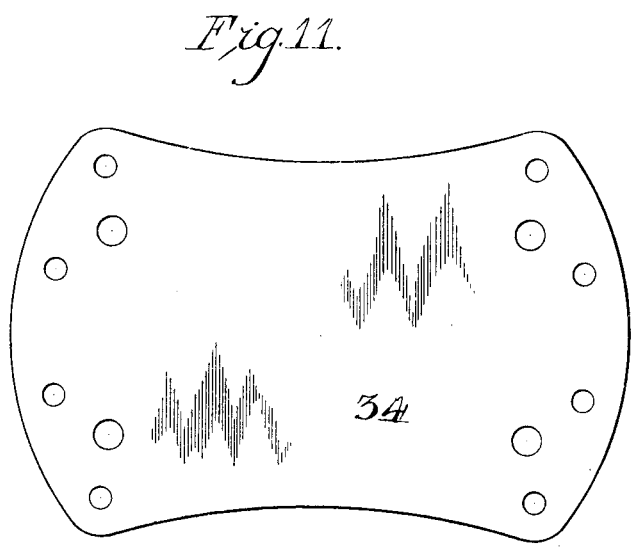
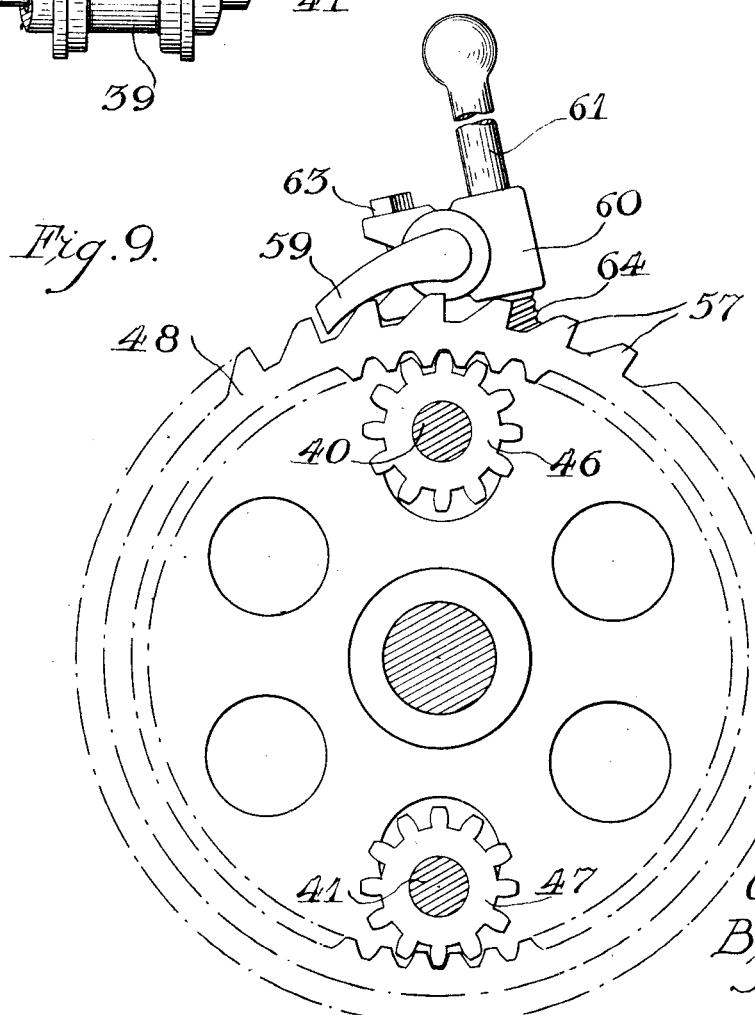
Inventor.
Charles Pearson.
By Nov. 5, 1929.   C. PEARSON   1,734,396
MOWING MACHINE
Filed April 9, 1927   7 Sheets-Sheet 7
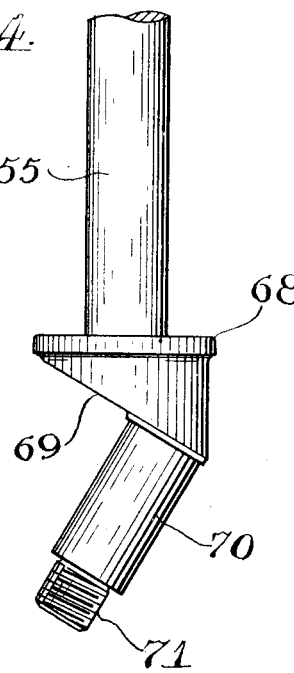
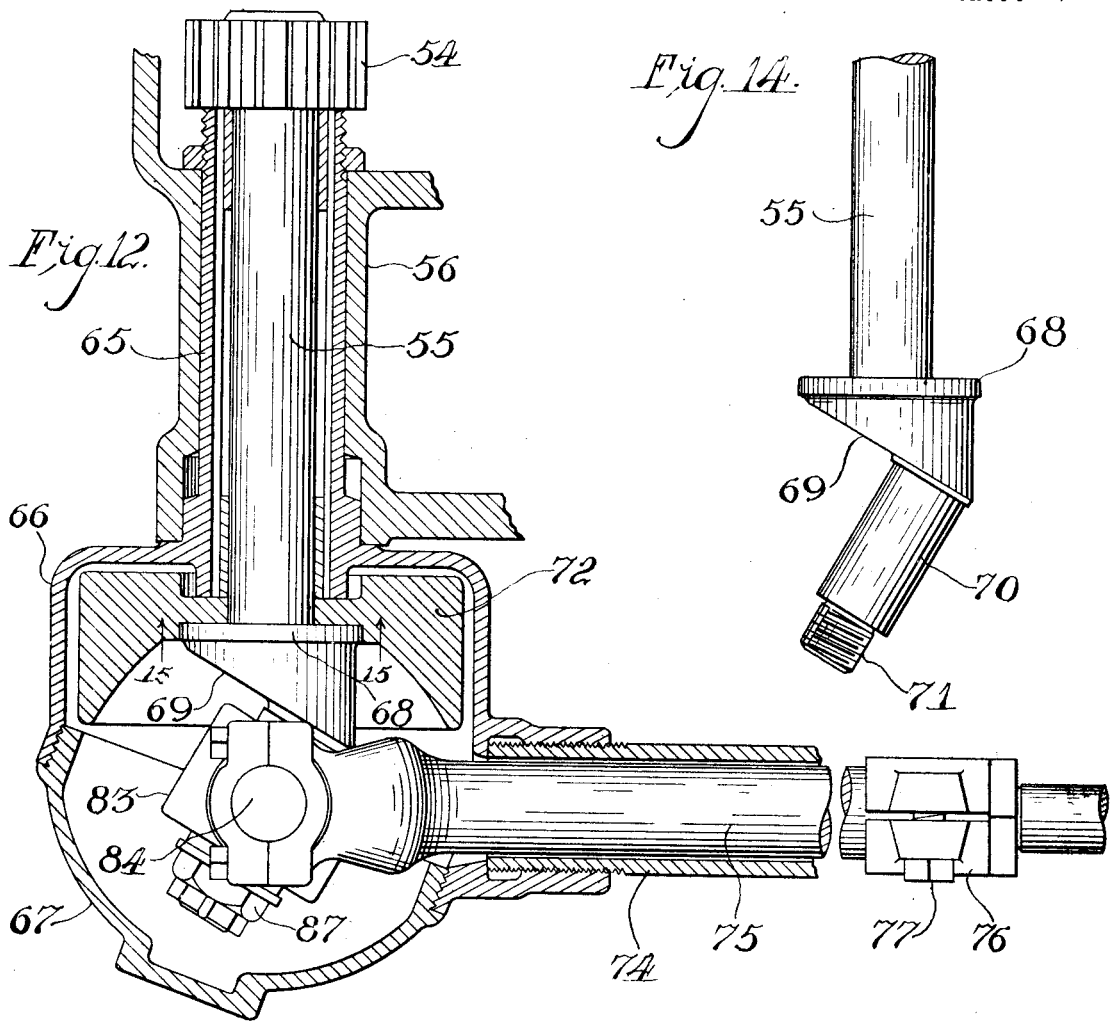
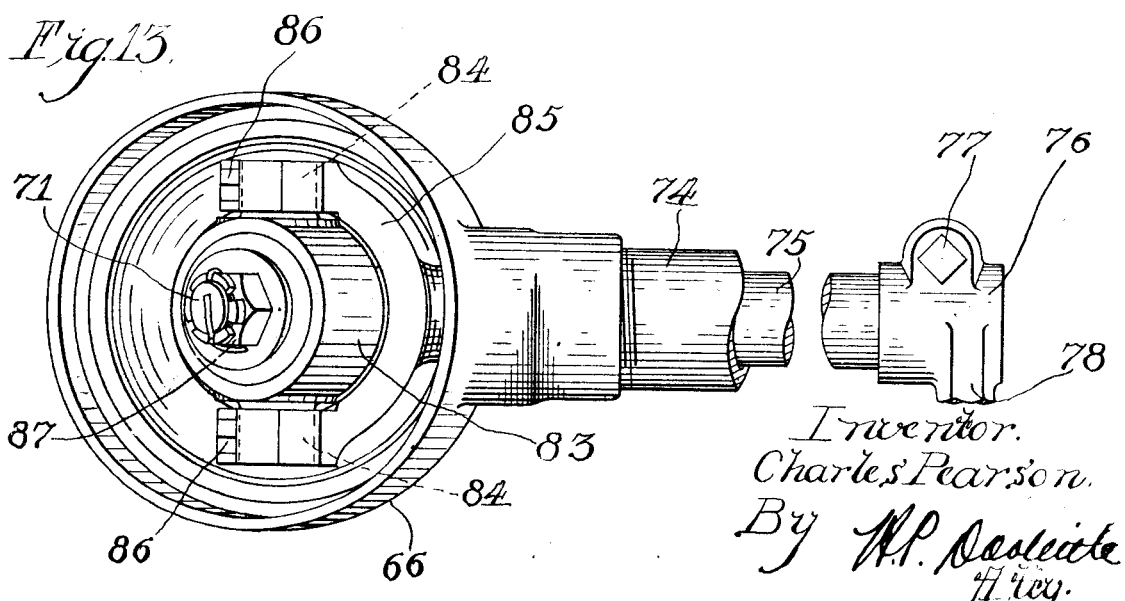
Inventor.
Charles Pearson.
By Patented Nov. 5, 1929

1,734,396

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

MOWING MACHINE

Application filed April 9, 1927. Serial No. 182,194.

This invention relates to mowing machines and particularly to that type in which a reciprocatory cutting mechanism is driven from ground wheels. More specifically, it relates, among other things, to an improved construction of machine in which the reciprocatory cutting mechanism is driven by means of a novel power transmitting mechanism.

The objects of the invention are to provide an improved ground wheel and axle driven mower embodying a reciprocatory cutting mechanism; to provide an improved transmission mechanism for converting rotary motion into oscillatory motion for reciprocating the cutting mechanism; to provide such a mower construction in which the transmission mechanism is enclosed in a dirt proof and lubricant containing casing; to provide an improved coupling frame; to provide an improved mechanism for permitting a vertical, or high lift, adjustment of the cutter bar; to provide a mower in which the space between the wheels may be varied; and, lastly, generally to simplify and improve mowing machines of the type mentioned.

Concisely stated, these very desirable objects are achieved in a two wheel mower in which the axle is in two parts, split substantially midway between its ends. These axle parts are keyed to the ground wheels so that the wheels may impart rotary movement to the axle. Adjacent its center the axle carries a housing which encloses a pawl and ratchet clutch driven gear mechanism, said gear mechanism being operative to drive rotatably a countershaft parallel with the axle, said countershaft having at its end adjacent the grassward ground wheel, a connection with a longitudinally and forwardly extending shaft. This longitudinally disposed shaft is oscillated or rocked thru the medium of the connection mentioned, said connection converting the rotatable motion of the countershaft and axle into a rocking motion for the said longitudinal shaft. The longitudinal shaft carries fast at its forward end, a pendulous arm which has a short link connection with a knife head connected to the cutting mechanism. And so, the rockshaft is caused to reciprocate the cutting mechanism. The transmission mechanism is housed in a dust proof and oil containing casing carried on the axle, which casing also serves as the frame of the machine.

The cutter bar is pivotally connected to a coupling yoke, the yoke in turn being rockably connected to a coupling arm. Said coupling arm extends diagonally back and is pivoted to the frame adjacent the stubbleward ground wheel. A control or gag device is carried on the frame and is adapted to act on this coupling arm to permit adjustment or lift of the cutter bar to extreme high or absolute vertical lift position.

An illustrative embodiment of the invention as above described is shown in the accompanying sheets of drawings, wherein:

Figure 1 is a general plan view of a mower constructed in accordance with the improvements of this invention;

Figure 2 is a general side elevational view of the structure shown in Figure 1;

Figure 3 is a front elevational detail view, illustrating the cutter bar in its vertically adjusted position;

Figure 4 is a front view of the axle and ground wheel mounting per se;

Figure 5 is a sectional detail view somewhat enlarged, showing the mounting of one ground wheel;

Figure 6 is a detail view showing the gag member for the coupling arm for permitting adjustment of the cutter bar to the extreme position shown in Figure 3;

Figure 7 is a vertical sectional view of the ratchet clutch driven, planetary transmission mechanism, when viewed from the rear of the mower, or as seen along the section line 7—7 of Fig. 1, looking in the direction of the arrows;

Figure 9 is a face view, partly in section, as seen along the line 9—9 of Fig. 7, when viewed in the direction of the arrows;

Figure 10 is a rear end view of the ratchet drive mechanism;

Figure 11 is a face, detail view of the separator disk;

Figure 12 is a detail plan view, partly in section, showing the countershaft and its connection with the longitudinal rockshaft, whereby rotary motion is converted into rocking motion to reciprocate the cutting mechanism;

Figure 13 is a detail, side elevational view, with parts broken away, to illustrate the rockshaft and motion converting mechanism shown in Fig. 12;

Figure 14 is a detail view, showing the end construction of the countershaft;

Figure 15 is a detail sectional view taken along the line 15—15 of Figure 12.

Figure 8:
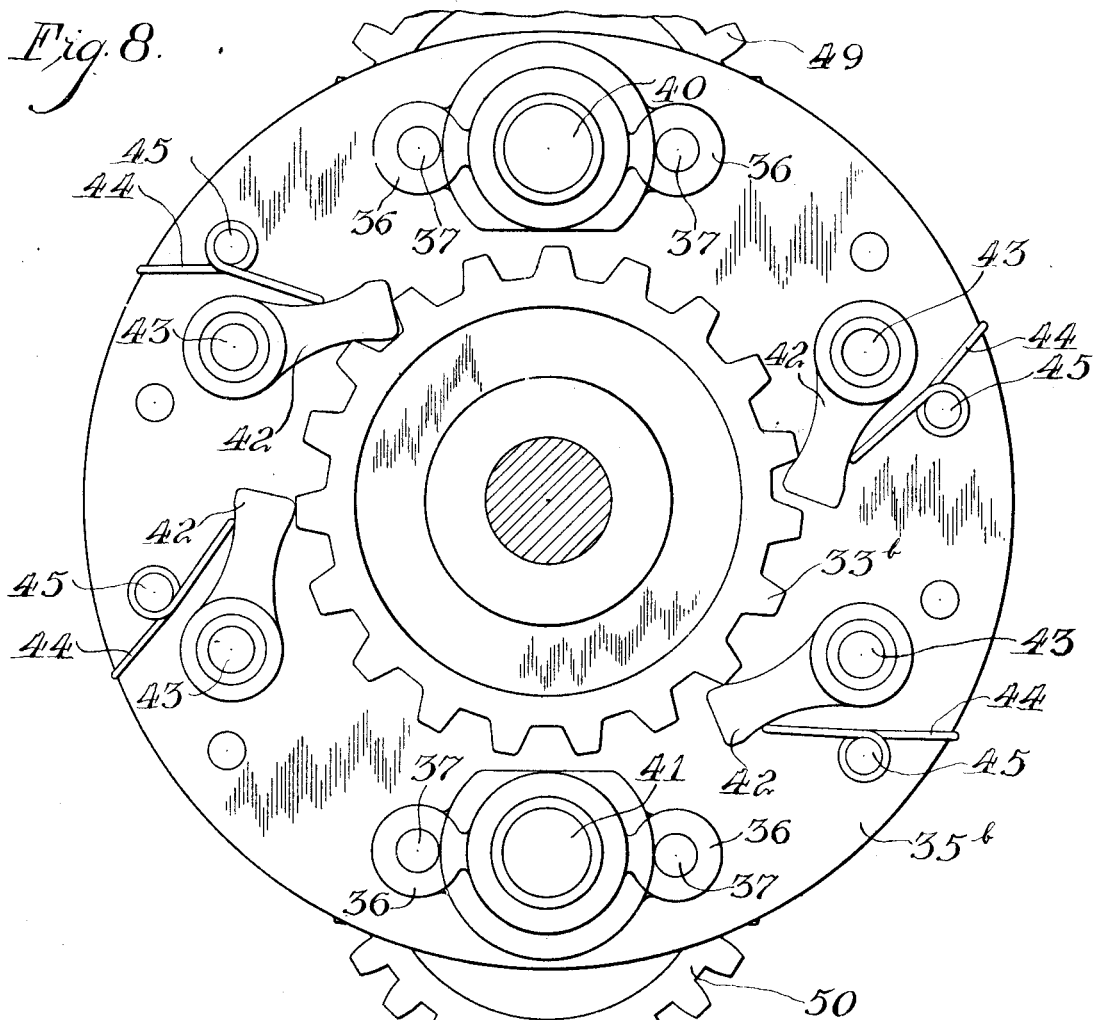
Figure 8 is an enlarged face view of a part of the ratchet clutch drive mechanism as seen along the line 8—8 of Fig. 7, looking in the direction of the arrows.
Figure 16:
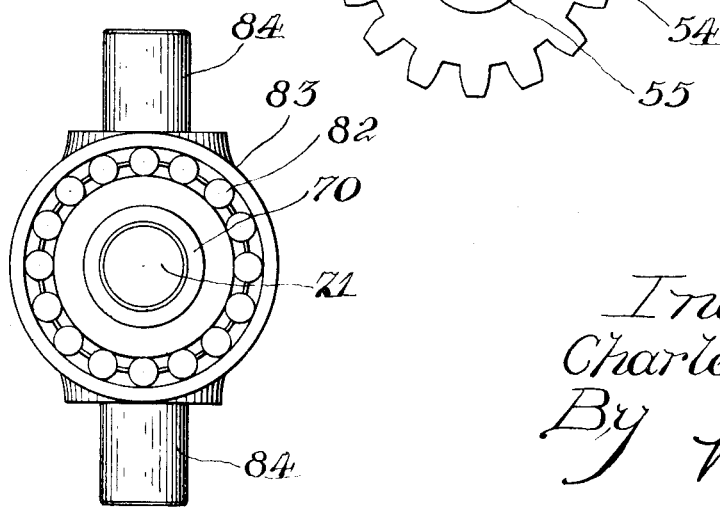
Figure 16 is a detail end view of the collar and pin parts carried on the angular pin shown in Figure 14.

The improved mower comprises a pair of ground wheels 15 made fast to an axle 16 by means of keys 17, so that the axle will turn with the wheels. The main frame of the machine comprises a unitary casting 18 carried on the axle and enclosing the same. The frame 18 carries an operator's seat 19 and a pair of sockets 20, which alternately may receive a draft member 21 or a tool box, not shown.

The unders side of the frame 18, adjacent the stubbleward wheel 15 carries a bracket 22 in which is pivotally hung, a forwardly and diagonally extending coupling arm 23, to the forward end of which is rockably connected at 24, a coupling yoke 25. This yoke pivotally carries in any approved manner, as by means of the pivots 26, a shoe 27, said shoe having connected rigidly thereto, a laterally extending cutter bar 28, as shown.

The cutter bar 28 carries the usual guard fingers 29 between which are arranged the knife sections 30 connected to any suitable form of knife head 31, said knife head and cutting mechanism being reciprocable by the improved power transmission mechanism now to be described.

As shown particularly well in Figure 7, the main axle 16 is split, thus providing two coaxial axle sections $16^a$ and $16^b$. This split in the axle occurs substantially midway between its ends, but slightly offset in the direction of the grassward side of the machine. At this point, the main frame casting 18, in which the axle is rotatably journaled, is enlarged, as at $18^a$, the same being provided with a removable cover plate $18^b$ made fast by suitable bolts 32, as seen in Figure 1.

The adjacent ends of the axle sections $16^a$ and $16^b$ are each reduced and screw-threaded to receive threadedly fast thereon, ratchet wheels $33^a$ and $33^b$. A separator plate 34 is arranged between these ratchet wheels. (See Figure 11.) Loose on the outer ends of the hubs of these ratchet wheels are clutch plates $35^a$ and $35^b$, which at their upper and lower ends (see Figure 8) carry ears 36, said ears being apertured to receive pins 37 for fastening the clutch plates $35^a$ and $35^b$ to sleeves 38 and 39, which loosely carry planetary shafts 40 and 41, respectively. Each clutch plate $35^a$ and $35^b$ carries four spaced pawls 42 pivoted on pins 43 which are passed thru both of said clutch plates, as shown in Figure 10, and thru the separator plate 34. Each pawl 42 is pressed toward its ratchet wheel $33^a$ and $33^b$ by means of springs 44 carried on pins 45 and secured to the edge of each clutch plate, as shown. On each clutch plate at least one pawl 42 will always be engaged with a tooth on its adjacent ratchet wheel.

The planetary shaft 40 carries fast at its stubbleward end a pinion 46, and the planetary shaft 40 similarly carries fast thereon a pinion 47, said pinions meshing with a large internal ring gear 48 loose on the axle section $16^a$, as shown in Figure 7. The opposite ends of the planetary shafts 40 and 41, respectively, carry fast thereon, relatively larger pinions 49 and 50, each of which is in mesh with a gear 51 loose on the axle section $16^b$, said gear having an extended hub portion 52 which carries fast thereon, a large gear 53. This gear 53 meshes with a small pinion 54 fast on a grasswardly extending countershaft 55 paralleling the main axle and journaled therebeneath in a housing extension 56 extending from the housing part $18^a$.

It is to be noted, see also Figure 9, that the internal ring gear 48 is formed with an external ratchet wheel surface 57. The casing part $18^b$ turnably carries a laterally protruding stub shaft 58, the end of which inside the housing carries a pawl 59 adapted to engage the teeth of the ratchet wheel surface 57. The external end of the shaft 58 carries a pinch bind bracket 60 thru which is passed a lever 61, the lower end of which is pivotally connected to a crank 62, said crank in turn being pivotally mounted in the housing part $18^b$. The pinch bind bracket 60 carries a tightening bolt 63 so that the same will tightly bind or grip the shaft 58. Encircling the lower end of the lever 61 between the bracket 60 and crank 62 is a coil spring 64. Thus, it can be seen that a toggle lever control is provided, which, by means of the spring 64, will be positively held with the pawl 59 in engagement with the ratchet teeth 57, or will be held positively out of engagement with said ratchet teeth.

In the operation of this planetary gear, ratchet driven, transmission mechanism, it will suffice for the present to say that the rotary motion of the ground wheels and axle sections will, thru this transmission mechanism, rotate the countershaft 55, when the pawl 59 locks the gear 48 against rotation;

and, vice versa, when said gear 48 is unlocked, the counter shaft 55 remains idle.

The purpose of this ratchet operated planetary gear mechanism, of course, is to operate the reciprocatory cutting mechanism 30 of the mower. It is to be remembered in this connection that it was an object to convert the rotary motion of the transmission into oscillatory motion for imparting reciprocatory motion to the cutting mechanism of the mower. This mechanism will next be described.

As seen in Figure 12, the housing part 56 turnably carries a collar 65 which terminates at its grassward end in a housing 66, having a removable cover 67. The shaft 55 projects into the housing 66 where it is formed with a flanged flat head 68 (see Figures 12, 14 and 15) and an inclined part 69 extending therefrom, there further being an inclined wrist pin 70 extending perpendicularly from the high end of said inclined portion 69, as shown. The free end of said pin is reduced and threaded as at 71. A relatively heavy flywheel 72 is arranged around the shaft 55 and made fast to the flanged head 68 by means of bolts 73.

The housing 66 carries at a right angle to the extension 56, or in a longitudinal, forward direction, a housing part 74, in which is arranged for rocking movement, a rockshaft 75, said shaft carrying at its forward, free end a pinch bind bracket 76 made fast on the said shaft by a bolt 77, the bracket, furthermore, having an integrally formed, pendulous arm 78 extending therefrom. The housing part 74 is secured at its front end in the coupling yoke 25, thus forming with the coupling arm 23 a rigid, pivoted, supplementary, or coupling frame. This arm 78 has a pivotal connection at its lower end with a short pitman, or link 79, said link at its other end being formed with spring pressed jaws 80 embracing a balled head 81 on the knife head 31, to form a ball and socket joint. (See Figures 1, 2 and 3.)

Referring again to Figures 12, 13, 14, 15 and 16, it will be seen that a novel motion changing means is provided for connecting the rotary countershaft 55 with the rockshaft 75. The angularly disposed pin 70. carries on a roller bearing 82, a collar 83 having a pair of oppositely extending pins 84, to which are pivotally connected the legs of a bifurcated yoke 85, by means of bolts 86, said yoke being rigidly connected to the rockshaft 75. A nut 87 secures the collar 83 on the pin 70, said nut being threaded onto the reduced threaded extension 71 of said pin 70, as shown. By this connecting means just described the rotary motion of the countershaft 55 is converted into a rocking movement for the rockshaft 75, whereby, thru the pendulous arm 78, the cutting mechanism of the mower is reciprocated.

Control means is, of course, provided for adjusting the cutter bar to intermediate lift position for permitting the bar to pass small obstructions, or to absolute vertical lift position for extreme conditions, but mainly for narrowing the machine to permit convenient transport thereof.

This control means comprises a lifting arm 88 pivoted at 89 to the main frame, as shown in Figures 1 and 2. This arm carries a hand lever 90 and a foot lever 91, the hand lever carrying a gravity locking pawl 92 adapted to cooperate with a notched sector plate 93 carried on the frame. The forward end of the lifting arm has connected to it, a depending link 94, which link in turn is connected to an arm 95 pivoted in the coupling yoke 25 on a pin 96. The other end of the arm 95 is connected to a pull link 97 which is connected to the rear part of the casting forming the shoe 27.

It is to be remembered, as has been previously described, that the coupling arm 23 and casing 74 are both pivotally mounted at their rear ends beneath the mower axle. These pivots are in transverse alinement as can be seen from Figures 1 and 12. Accordingly when the hand lever 90 is moved to swing the lifting arm 88 upwardly, the connections described will raise the said coupling arm 23 and casing 74, and the coupling yoke 25 bodily therewith, at the same time, by means of the pull link 97, raising the cutter bar about its pivots 26, to the usual intermediate lift position for clearing ordinary obstructions. The foot lever 91 merely serves as an assisting means for the hand lever 90. Thus, the diagonal arm 23, sleeve 65 and housing 74 form a triangular, rigid coupling frame which is pivotally hung beneath the main frame on pivots the axes of which are in transverse alinement.

If it is desired to elevate the cutter bar to absolute vertical position, as shown in Figure 3, it is necessary to restrain the upward swinging movement of the coupling arm, so that the pull link 97 can be brought into play to pull the bar all the way up to this extreme position. Accordingly, a coupling arm gag lever has been provided, the same (see Figures 1 and 6) comprising a depending arm 98, adjustably carried in a bell crank lever 99 forming a foot treadle, said bell crank lever being pivoted on a pin 100 carried in the main frame of the mower, said bell crank lever and adjustable arm being normally pressed to inactive position, as shown in Figure 6, by means of a suitably mounted coil spring 101. It is to be noted that the lower end of the arm 98 is appropriately formed to receive the coupling arm 23. In operation, the operator rocks the bell crank 99 by foot pressure on the treadle portion shown, whereupon the arm 98 is brought into the path of upward movement of the coupling arm 23, which accordingly will be restrained, thus, permitting the pull link 97 to come properly into play to elevate the cutter bar to absolute vertical lift position, as has been explained.

For the purpose of tilting the cutter bar to adjust its height of cut from the ground, a conventional link 102 is connected to the upper end of the coupling yoke, which link may be pulled or pushed by any suitable form of lever mechanism, not shown, to rock the said coupling yoke 25 around the end of the coupling arm 23, to tilt the cutter bar, as stated, it being remembered that the shoe 27 carrying the cutter bar is connected to said yoke 25.

One more feature of this invention remains to be described. Sometimes it may be advantageous and desirable to utilize a cutter bar of longer length than the length of the regular cutter bar, and accordingly means has been provided for widening the wheel spacing, so that the machine will be more stable when employing a longer cutter bar. Looking to Figures 1, 4 and 5, it will be remembered that the ground wheels 15 are made fast to the axle by means of keys 17. It is to be noted that each wheel 15 is formed with a hub 103 having a short portion 104 and a long portion 105 on its opposite end. Adjacent each wheel, the axle is provided with a stop flange 106, as shown. It can now be seen that when the short portion of each wheel hub 103 abuts the stop flange 106, the spacing between the wheels will be just right for utilization of the regular length cutter bar; but, when the long portions 105 of the hubs abut the flanges 106, the wheels will be spaced farther apart, as shown in the dotted position of the wheels in Figure 4. Thus, we can obtain a wider wheel spacing to provide a stable wheel support when employing a cutter bar of greater length than the regular cutter bar.

The operation of the improved mower will now be described. An operator occupies the seat 19, and draft animals will be conventionally hitched to the draft tongue 21 to pull the machine. Forward movement of the machine, of course, causes the wheels 15 to turn, and with them, the axle sections 16ª and 16ᵇ comprising the main axle, keyed fast to the wheels, as has been described. Rotation of the axle sections will turn the ratchet wheels 33ª and 33ᵇ, and, by means of at least one of the pawls 42 in engagement with each of said ratchet wheels, will cause rotation of the loose clutch plates 35ª and 35ᵇ, thus carrying the shafts 40 and 41 around the axle sections 16ª and 16ᵇ in a planetary manner. If the operator has thrown the pawl 59 into engagement with the ratchet surface 57, by means of the lever 61, of course, the large internal ring gear 48 will be held against rotation, thus causing the pinions 49 and 50 on the planetary shafts 40 and 41 to drive the gear 51 and large gear 53. In this manner, rotation is imparted to the countershaft 55.

It will be understood when the pawl 59 is out of engagement with the ratchet surface on the large gear 48, that said gear will merely idle, because it is loosely mounted, and, accordingly, the gears 46 and 47 merely roll around in a reverse direction, the same being true to the pinions 49 and 50, which now cannot drive the gear 51. Thus, the large gear 53 idles without causing the countershaft 55 to turn, as will be understood.

When the mower is making a turn, the ratchet clutch will, of course, permit a differential movement between the ground wheels, because one axle section may move slower, or even reverse in rotation, as its adjacent clutch part will merely overrun without driving for the moment, while the other clutch part continues to drive the countershaft so that operation of the mower will not be affected.

As the shaft 55 rotates, its movement is transferred to the longitudinal shaft 75 by the connection described, said connection converting the rotary motion of the shaft 55 into rocking motion for the shaft 75. Thus, the pendulous arm 78 is rapidly swung from side to side to reciprocate the mower cutting mechanism 30, by means of the link 79 and knife head 81.

The mower cutter bar, because of its pivotal connection to the coupling yoke, may drop or swing upwardly in accordance with ground slopes, and still have its cutting mechanism uninterruptedly reciprocated, because of the proximity of the source of power therefor, in the arm 78, and the short length pitman 79 which can be employed as a result thereof. Furthermore, this improved construction will permit reciprocation of the cutting mechanism when the cutter bar is adjusted to intermediate lift position, or even when said bar is adjusted to its extreme, or absolute vertical lift position.

The entire transmission from, and including the ratchet clutch driven planetary transmission, to the pendulous arm 78 is enclosed in dirt proof communicating housings, and, as a result, such housings can be filled with lubricant to permit operation of all parts of the driving mechanism stated, to operate in oil, thereby making for easier running of all parts with friction reduced to a minimum.

In making an adjustment of the cutter bar to vertical lift position, the gag arm 98 is brought into play to restrain upward movement of the coupling arm 23, which permits the lever operated pull link 97 to swing the bar up to this absolute vertical position.

When it is desired to employ a cutter bar of greater length than the length of the regular cutter bar, the wheels 15 are reversely mounted on the axle, the longer hub parts 105 thereof causing the wheels to be materially spaced farther apart, thus affording a more stable mounting when employing a longer cutter bar, as will be understood.

Another advantage of locating the drive pawl and ratchets between the outer ends of the axle can now be appreciated, as it makes for easy reversal of the wheels in the manner and for the purposes stated. Obviously in the standard mower, in which the pawl and ratchet drive is at the outer ends of the axle in the wheel hubs, it is not possible to get this advantage of wheel reversibility to widen or narrow the wheel spacing. The pawl and ratchet drive located at the middle of the axle is thus located in the oil and dirt proof case. Noise of the pawl and ratchets is eliminated due to the case enclosing these parts. Still more important is the advantage of eliminating all exposed gears adjacent the drive wheel as in most standard mowers. In this invention the two part axle permits location of the drive gear nest at any point between the ends of the axle, thus allowing a wide range of design in locating and balancing parts on the main frame.

From the above detailed description it must now be appreciated that the improved mower of this invention achieves all of the desirable objects heretofore recited, and that the structure is simple and practicable and lends itself to manufacture at reasonable cost.

While there has been herein disclosed only an illustrative embodiment of this invention, it is to be understood that the same is, of course, susceptible of change and modification without departing from the spirit and scope thereof, and that it is the intention, as indicated in the subjoined claims, to cover all such changes and modifications as do not materially depart from this invention.

What is claimed is:

1. In a mowing machine, a rotatable split axle, transmission gearing differentially rotated by said axle, a countershaft rotated by said gearing including a motion changing means, a rockshaft connected to said means to be operated thereby, a cutting mechanism, and means connecting the same to said rockshaft.

2. In a mowing machine, a differentially rotatable two part axle, a planetary transmission gearing rotated by said axle, a countershaft rotated by said gearing including a motion changing means, a rockshaft connected to said means to be operated thereby, a cutting mechanism, and means connecting said cutting mechanism to the rockshaft.

3. In a mowing machine, a transverse rotatable axle, a ratchet clutch driven planetary transmission gearing carried on said axle between the ends thereof, a countershaft rotated by said gearing and arranged in parallelism with the axle, said countershaft operating a motion changing means, a rockshaft extending longitudinally of the machine and operated by said motion changing means, and a cutting mechanism connected to be driven by said rockshaft.

4. In a mowing machine, a rotatable axle comprising two coaxial sections, a ratchet wheel fast on each axle section at their inner ends, a clutch plate adjacent each ratchet wheel, pawls on the plates engaging the said ratchet wheels to be rotated thereby, a planetary gear transmission operated by said plates, a countershaft rotatably driven by said transmission, said countershaft including a motion changing means, a rockshaft connected to said means and operated thereby, a reciprocatory cutting mechanism, and means connecting the cutting mechanism to the rockshaft to be reciprocated thereby.

5. In a mowing machine, a rotatable two part axle, rotatable transmission gearing adapted to be differentially driven thereby, a countershaft rotated by said gearing, a motion changing means operated by said countershaft, a shaft rockably driven by said motion changing means, a pendulous arm carried by the rockshaft, cutting mechanism connected to be reciprocated by said arm, and a casing enclosing the transmission, countershaft, motion changing means and rockshaft.

6. In a mowing machine, a rotatable axle, a planetary gear transmission driven from said axle, a countershaft adapted to be rotated by said transmission, a rockshaft, means connecting the countershaft and rockshaft for converting the rotary motion of the former into rocking motion for the latter, a cutting mechanism connected to be driven by said rockshaft, and means for unlocking an element of the transmission for holding the countershaft idle.

7. In a mowing machine, a differentially rotatable two part axle, a clutch driven planetary gear transmission on said axle and operated thereby, a rockshaft, means including motion changing mechanism for driving said shaft with a rocking movement from said planetary gear transmission, a cutting mechanism connected to be driven from said rockshaft, a casing enclosing the said transmission, motion changing means and rockshaft, and control means carried by said casing for unlocking an element of the transmission to cause said transmission to idle without driving the rockshaft.

8. In a mowing machine, a transverse axle, a main frame thereon, a coupling arm pivotally connected to the main frame, a coupling yoke connected to said coupling arm, and a housing pivoted to the main frame and connected to the coupling yoke, said arm, housing, and yoke forming a pivoted coupling frame, the pivotal connections therefor to the main frame being underneath the axle and in transverse alinement.

9. In a mowing machine, a main frame, a coupling arm pivotally connected thereto, a coupling yoke rockably connected to said arm, a cutter bar pivotally connected to said yoke, lever means for adjusting the bar to plain lift position, and means pivoted to said main frame for restraining the upward movement of the coupling arm, whereby said lever means may be caused to raise the cutter bar to absolute vertical lift position.

10. In a mowing machine, a main frame, a coupling arm pivotally connected thereto, a coupling yoke rockably connected to said arm, a cutter bar pivotally connected to said yoke, lever means for adjusting the bar to plain lift position, and a bell crank lever having an adjustable arm, said lever being pivoted to the main frame and adapted to have its said adjustable arm restrain the upward movement of said coupling arm, whereby said first lever means may be caused to raise the cutter bar to absolute vertical lift position.

11. In a mowing machine, a main frame, a coupling arm pivotally connected thereto, a coupling yoke rockably connected to said arm, a cutter bar pivotally connected to said yoke, lever means for adjusting the bar to plain lift position, adjustable means pivotally carried by the main frame, said means adapted to restrain the upward movement of the coupling arm, whereby said lever means may be caused to raise the cutter bar to absolute vertical lift position, and means for normally holding said restraining means out of the path of movement of the coupling arm.

12. A mower having a main frame including a gear housing, a transverse two part axle comprising two coaxial pieces having their inner adjacent ends carried inside the gear housing and their outer ends connected to ground wheels, a sickle, and means located in the housing and driven from the inner ends of the axle pieces to drive the sickle.

13. A mower having a main frame including an enclosed gear housing, a transverse two part axle comprising two coaxial pieces having their inner adjacent ends substantially midway between their outer ends carried inside the gear housing and their outer ends made fast to ground wheels, a sickle, and means located in the housing and driven from the inner ends of the axle pieces to drive the sickle.

14. A mower having a main frame including a gear housing, a transverse two part axle comprising two coaxial pieces having their inner adjacent ends carried inside the gear housing and their outer ends connected to ground wheels, a sickle, pawl and ratchet devices operated by the adjacent inner ends of the axle pieces and located in the housing, and gearing in the housing operated by the pawl and ratchet devices for operating the sickle.

15. A mower having a main frame including a gear housing, a transverse two part axle comprising two coaxial pieces having their inner adjacent ends carried inside the gear housing and their outer ends connected to ground wheels, a sickle, pawl and ratchet devices operated by the adjacent inner ends of the axle pieces and located in the housing, a counter-shaft projecting into the housing and connected for driving the sickle, and gearing inside the housing operated by the pawl and ratchet devices for driving said counter-shaft.

16. A mower having a cutting mechanism, driving wheels, a divided axle on which the wheels are fixed, and driving mechanism for the cutting mechanism located intermediate the ends of the axle.

17. A mower having a cutting mechanism, driving wheels, a divided axle on which the wheels are fixed, and differential driving mechanism for the cutting mechanism located intermediate the ends of the axle.

18. A mower having a frame, cutting mechanism, driving wheels, a divided axle on which the wheels are fixed, the frame including an enclosed housing, and driving mechanism for the cutting mechanism located in the housing intermediate the ends of the axle.

19. A mower having a cutting mechanism, driving wheels, a divided axle on which the wheels are fixed, differential driving mechanism located intermediate the ends of the axle, and intermediate driving mechanism operated by the differential driving mechanism for driving the cutting mechanism.

In testimony whereof I affix my signature.

CHARLES PEARSON.